United States Patent [19]
Eley

[11] Patent Number: 4,719,577
[45] Date of Patent: Jan. 12, 1988

[54] BENDING MACHINE WITH DIGITAL ELECTRONIC CONTROL OF BEND ANGLE

[76] Inventor: David L. Eley, 2433 Wood Dr., Beloit, Wis. 53511

[21] Appl. No.: 738,726

[22] Filed: May 29, 1985

[51] Int. Cl.$^4$ .................. B21D 9/00; B21D 7/00; B41F 45/00
[52] U.S. Cl. .................................. 364/474; 72/7
[58] Field of Search ............. 72/7; 364/167, 142, 364/476, 174, 603, 475, 474; 318/568; 346/33 MC

[56] References Cited

U.S. PATENT DOCUMENTS

| | | | |
|---|---|---|---|
| 3,557,585 | 1/1971 | Inda | 72/7 |
| 3,624,371 | 11/1971 | Neal et al. | 346/33 MC |
| 3,653,251 | 4/1972 | Coonan | 72/7 |
| 3,812,351 | 5/1974 | Coberley | 377/17 |
| 4,039,826 | 8/1977 | Wingate | 250/239 |
| 4,100,780 | 7/1978 | Sassak | 72/7 |
| 4,161,110 | 7/1979 | Ritter et al. | 364/476 |
| 4,181,962 | 1/1980 | West | 377/3 |
| 4,232,335 | 11/1980 | Nakagawa | 346/33 MC |
| 4,233,592 | 11/1980 | Leichle | 377/17 |
| 4,486,840 | 12/1984 | Klein et al. | 364/476 |
| 4,486,841 | 12/1984 | Koyama et al. | 364/476 |
| 4,488,237 | 12/1984 | Aronson | 72/7 |
| 4,568,864 | 2/1986 | Gisske | 318/294 |

*Primary Examiner*—Jerry Smith
*Assistant Examiner*—Allen MacDonald
*Attorney, Agent, or Firm*—Lackenbach Siegel Marzullo & Aronson

[57] ABSTRACT

A bending machine with a rotatable bending shoe for bending conduit and pipe includes a digital electronic control system with memory for providing accurate bending control and accurate repeat bending of successive conduits or pipes to substantially the same angle. A sensor is provided for determining increment degrees of rotation of a gear in the bending shoe drive train with the increments correlated to a particular degree of rotation of the bending shoe. The sensor signals are input to counting and comparator devices to terminate bending after the shoe rotates the degrees stored in memory for a particular bend.

7 Claims, 7 Drawing Figures

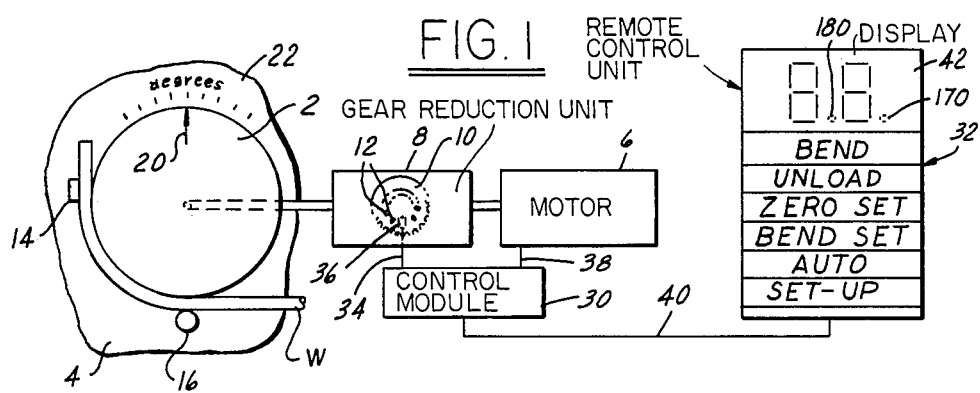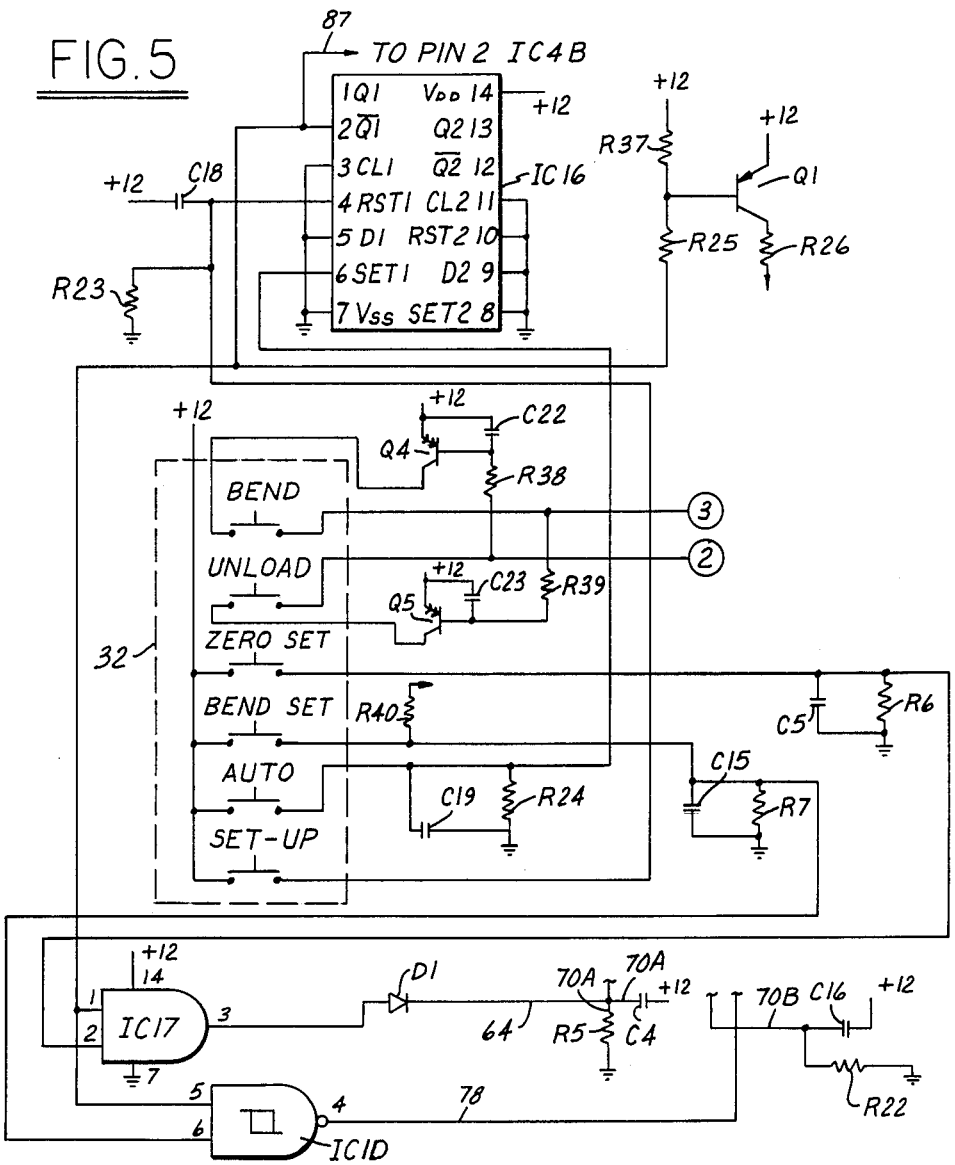

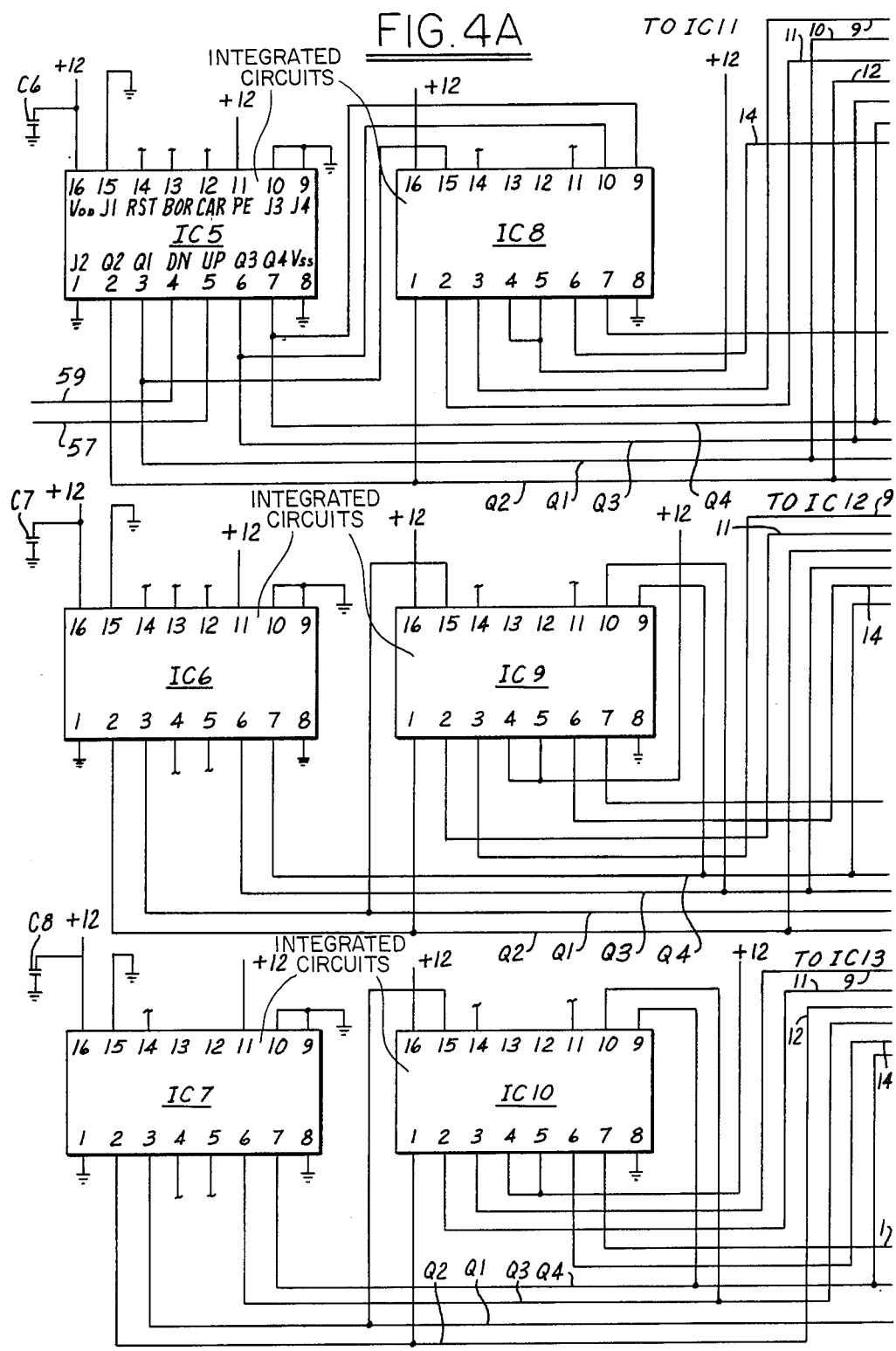

4,719,577

BENDING MACHINE WITH DIGITAL ELECTRONIC CONTROL OF BEND ANGLE

FIELD OF THE INVENTION

The present invention relates to bending machines for conduit, pipe, tube, cable and other workparts.

BACKGROUND OF THE INVENTION

Electric bending machines have been employed in the past to make on-site bends in conduit and pipe for installation in buildings and in which electrical wire or cable are routed to provide electrical service throughout the building. Oftentimes there is a need to effect substantially duplicate bends successively in several conduits or pipes for installation in the building.

A particular electric bending machine used by prior art workers bends the the conduit or pipe about a rotatable shoe while the conduit or pipe is supported by a support roller mechanism. The bending shoe is rotated by an electric motor of permanent-magnet field D.C. type through a reduction gear mechanism. A pipe length is held on the bending shoe by a lug on the shoe and is guided over the support roller assembly as the bending shoe is rotated clockwise. Rotation of the bending shoe is continued until a pointer or other reference marker on the bending shoe moves relative to a bending degree scale on the frame of the machine to the desired degree bend selected; e.g. until the pointer on the shoe registers with the 60° mark on the bending degree scale. The conduit or pipe is removed after bending by rotating the bending shoe in the opposite direction.

In attempting to make duplicate bends in several conduits or pipes, the operator of the machine would place a new length of conduit or pipe in the machine and rotate the bending shoe until the shoe pointer registered with the desired degree bend number on the scale. Typically, the operator would jog the motor to slowly approach the desired degree bend number on the scale. However, due to the inability of mechanical relays in the control circuit to repeat exactly and due to inherent operator error and variation in registering the pointer and scale from one length of conduit or pipe to the next, this procedure is fraught with error so that substantially duplicate bends in several lengths of conduit or pipe are difficult to obtain. Also, this procedure is time consuming on-site as a result of the need to slowly jog the motor of the bending machine to obtain the desired degree bend as accurately as possible.

SUMMARY OF THE INVENTION

The present invention contemplates a bending machine for conduit, pipe and other elongate workparts having digital electronic control with memory to permit the operator to preselect or program and store a desired bend angle and to repeat substantially the same angle bend in multiple successive workparts.

In a typical working embodiment of the invention, the bending machine comprises a bending shoe means including a rotatable bending shoe, an electric motor for rotatably driving the bending shoe and means for drivingly connecting the electric motor and bending shoe. The digital electronic control includes (a) sensing means for determining the degree of rotation of the bending shoe by sensing the degree of rotation of the bending shoe means in increments during each bend-unload cycle with the increment and generated signal per increment produced by the sensing means being correlated with a particular degree of actual bending shoe rotation, (b) counting means for receiving and counting the increment signals from the sensing means relative to a start reference count during each bend-unload cycle; e.g., for counting up for rotation in the direction to bend pipe or conduit and counting down for rotation in the opposite direction to unload a bent pipe or conduit, (c) referencing means for providing the start reference count such as a zero count in the counting means at the beginning of the bending portion of the bend cycle of the machine, (d) storage means for storing the aggregate or finish count received from the counting means corresponding to the number of increment signal counts relative to the start reference count signals counted for rotation of the bending shoe to obtain the desired degree of bend, (e) means for transferring the finish count in the counting means to the storage means, (f) comparator means for comparing the stored finish count to the acutual count for each workpart during the bend cycle and (g) control means operative in response to a signal from the comparator means when the actual count for each workpart equals or exceeds the stored finish count for terminating rotation of the bending shoe to end bending of the pipe or conduit, such control means preferably being motor control means for stopping the electric drive motor. Preferably, the digital electronic control also includes rollover means operative in response to a count in the counting means counted during rotation of the bending shoe in the direction to unload a pipe or conduit after bending to permit rotation of the bending shoe in the unload direction by the electric drive motor past the start reference count, such as the zero count, so as to facilitate unloading of the bent pipe or conduit.

The digital electronic control also preferably includes a visual display means such as a numerical display responsive to the counting means for indicating the actual count in the counting means during the bend cycle.

BRIEF DESCRIPTION OF THE DRAWINGS

FIG. 1 is a schematic view of a pipe or conduit bend machine of the invention.

FIG. 5 is a circuit diagram of the remote control unit switch circuitry, reset and roll-over control of the control system of FIG. 2.

DESCRIPTION OF PREFERRED EMBODIMENTS

Figure 2:
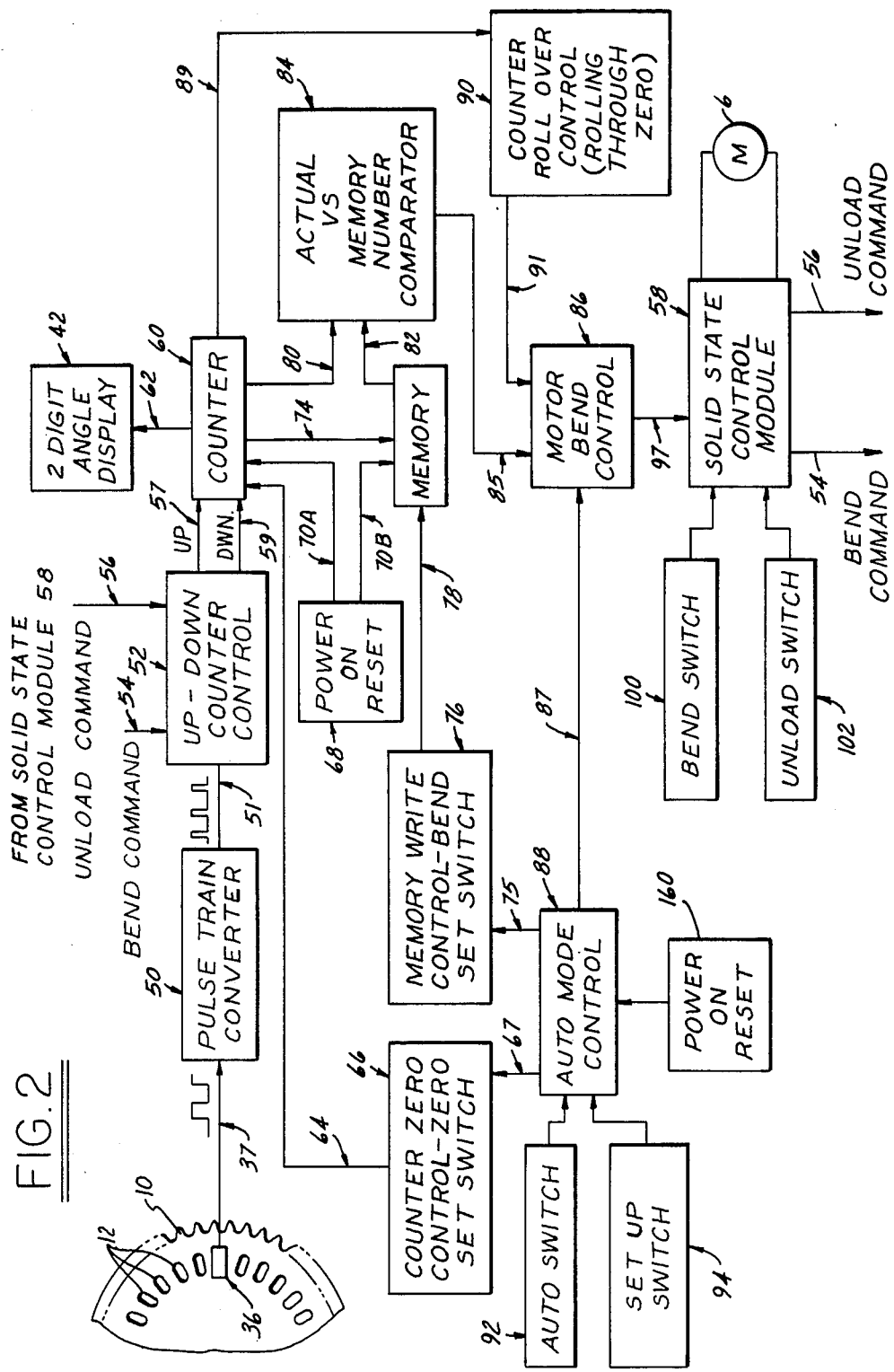
FIG. 2 is a schematic diagram of the digital electronic control system of the invention in a bending machine of the type shown in FIG. 1.

A bending machine constructed in accordance with the present invention is shown schematically in FIG. 1 as including a bending shoe 2 rotatable on machine frame 4 by an electric motor 6 through a chain and sprocket gear reduction mechanism 8. The gear reduction mechanism 8 is of the known type, e.g. as provided on a bending machine Model No. 555 commercially available from Greenlee Tool Co. of Rockford, Ill., and includes a rotatable toothed sprocket wheel 10 having a selected number of identical circumferentially equally spaced apart radial slots 12 around the entire sprocket intermediate circumference. A pipe or conduit length W is held on the bending shoe 2 for rotation therewith by a known saddle or lug 14 and is guided and supported by the support roller 16 mounted on machine frame 4. The pipe or conduit W is shown bent to about a 90° around the bending shoe. A pointer 20 on the bending shoe and a fixed bend degree scale 22 on the machine frame indicate the approximate angle of bend. In operation, the bending shoe is rotated clockwise to make a bend in the pipe or conduit (bend cycle) and counterclockwise to release the bent length for unloading from the machine (unload cycle).

A digital electronic control module 30 is mounted on the machine frame 4 to provide remote operator control of the bending machine from a pendant or remote control unit 32. The control module 30 includes solid state circuitry to be described and interfaces via line 34 with a proximity sensor 36 positioned in sensing relation with toothed sprocket wheel 10 in the gear reduction mechanism 8 to sense the number of circumferentially equally spaced apart slots 12 passing by the sensor as the sprocket wheel rotates during bending (clockwise rotation) and unloading (counterclockwise rotation). The sensor typically is fixedly mounted on the machine frame adjacent the reduction mechanism. Both the leading edge and trailing edge of each slot 12 are sensed by the sensor. A suitable proximity sensor is commercially available under designation 922AB1Y-A4N from Micro-Switch Inc. located at Freeport, Ill.

Taking into consideration the step down provided by the gear reduction mechanism 8, the incremental circumferential spacing between the slots 12 is selected to correlate to a particular degree of rotation of bending shoe 2 so that by sensing the number of slots 12 that have passed the sensor, the degrees of rotation of the bending shoe 2 can be determined. For illustration purposes, rotation of the bending shoe effective to cause the sensor to sense the leading and trailing edges of one slot would correspond to an incremental rotation of 2° of the bending shoe 2.

The control module 30 also interfaces via line 38 with the electric motor 6 which is of the permanent field D.C. type as will be described herebelow in detail.

As mentioned above, a pendant or remote control unit 32 is provided and interfaces via line 40 with the control module 30 as will be explained. The remote control unit includes a two digit display 42 of the LED or other types for displaying numerically the degree of rotation of the bending shoe relative to a start or reference position such as 0°. The remote control unit also includes bend, unload, zero set, bend set, auto and set-up switches as shown of the conventional membrane switch type to enable operator remote control of the operation of the bending machine.

The physical steps to operate the bending machine shown will now be described with a detailed description of the electronic circuitry to effect such physical control described thereafter.

Initially, the operator places a straight length of conduit or pipe between the bending shoe 2 and support roller 16 with the saddle 14 clamping the leading end of the length to the shoe 2. The bend shoe is then rotated clockwise by pressing the bend switch to snug the length between the shoe and roller without any bending of the conduit or pipe length, however, such that the length is securely held and cannot be moved manually by the operator. The operator would then press the zero-set switch to provide a start or reference count position for shoe rotation and the LED numerical display 42 will indicate zero. The operator would then push the bend switch to rotate the bending shoe 2 clockwise until LED numerical display 42 indicates that the desired shoe rotation has been obtained, e.g. the 90° rotation shown in FIG. 1 indicating that a substantially 90° bend has been imparted to the length of conduit or pipe. Th operator would then push the bend set switch to store the finish count corresponding to this degree bend in the control module 30 as will be explained and a bend-set LED indicator 170 on the display 42 would light while the bend set pushbutton is depressed. The unload switch would then be pressed to rotate the bending shoe counterclockwise back to or past the zero start or reference position set by pressing the zero-set button. The bent length is then unloaded from the machine.

Thereafter, to bend additional individual lengths of the same type of conduit or pipe to substantially 90°, the operator merely loads the straight length and snugs the length by pressing the bend switch. If necessary, the zero-set switch can be pressed again if the LED numerical display 42 does not indicate zero. Then, the operator presses the auto switch to activate the motor control and deactivate the zero set and bend set function to prevent accidental changes thereto. A LED auto indicator light 180 on display 42 will light when the auto switch is pressed and will remain on until the set-up switch is pressed. The bend switch is then pressed to bend the length of conduit to the stored substantially 90° bend angle with display 42 simultaneously displaying actual shoe rotation. The control module circuitry will rotate the bending shoe to the stored 90° bend position and stop the motor there. Repeat bends of additional lengths of conduit or pipe are thereby made. Of course, each subsequently bent length is unloaded by pressing the unload switch to rotate the shoe counterclockwise back to or past the zero-set position before the next length can be loaded and bent.

Those skilled in the art will appreciate that the accuracy of the bends made on the bending machine is determined mainly by the magnitude of the incremental circumferential spacing between slots 12 on the sprocket wheel 10. The smaller the incremental spacing, the more accurate the rotation of the bending shoe can be controlled and thus the more accurate the bend can be made.

Also, the storing of the desired degree bend angle in the memory of the control module 30 can be effected by the operator without a length of pipe or conduit in the machine. The operator would simply press the zero-set switch on the remote control unit 32 and then press the bend switch until display 42 indicated desired shoe rotation angle. The bend-set switch is then pressed to store the desired degree bend angle.

The electronic control system of the invention is shown in block diagrammatic form in FIG. 2. The sprocket wheel 10 and sensor 36 are shown in operative position. The sensor 36 senses the leading and trailing edge of each passing slot 12 in wheel 10 and outputs a square wave signal as shown for each slot edge sensed. The square wave output is received via line 37 by the pulse train converter 50 which converts the square wave signals to a series of short duration pulses; e.g. 25 micro-second pulses, as shown. The up-down counter control 52 receives the series of pulses via line 51 and also bend or unload commands via lines 54,56, respectively, from the solid state control module 58 to be described. Counter control 52 directs the series of pulses to the respective up or down input lines 57,59 of counter 60 which may comprise multiple counters depending upon the number of digits desired to express degree of bending shoe rotation. Counter control 52 also includes delay timers to be described for maintaining counter operation during machine mechanical drift from inertial effects after release of the bend and unload switches on remote control unit 32.

Counters 60 are of the conventional type to be described and count the series of pulses upwardly for bend and downwardly for unload and interface via line 62 (multiple lines see FIG. 6) with numerical display 42 so that actual count therein is visually displayed to the operator. Counters 60 may each be reset to zero count via line 64 by counter zero control-zero set switch 66. Power on reset 68 also sets the counters 60 to zero via line 70A.

The count in counters 60 can be transferred to one or more memory elements 72, which may comprise multiple memory elements corresponding in number to the number of counters, via line 74 by memory write control-bend set switch 76 connected to memory 72 via line 78.

The actual count in counters 60 and the stored aggregate or finish count in memory elements 72 are inputted via lines 80 and 82 to comparator 84 which may comprise multiple comparators of equal number to the counters 60 and memory elements 72.

Motor bend control 86 interfaces with comparators 84 via line 85, auto mode control 88 via line 87 and counter rollover control 90 via line 91. Auto mode control 88, when activated by pressing auto switch 92, permits motor bend control 86 to send a stop signal to solid state control module 58 via line 97 to stop motor 6 when the comparators 84 indicate that the actual count equals or exceeds the stored finish count for a desired angle of bend. When activated by pressing the set-up switch 94, auto mode control 88 directs the motor bend control to ignore any signal received from comparators 84 to prevent motor 6 from being stopped during set-up and programming of the machine.

Counter rollover control 90 interfaces with counters 60 via line 89 and is operative to direct motor bend control 86 to ignore signals from comparators 84 during rollover of the counters past zero especially during conduit loading or unloading to facilitate operation of the machine.

Solid state control module 58 may be of the type described in copending U.S. application Ser. No. 638,080 filed Aug. 6, 1984 entitled Electric Motor Control For A Pipe Bender of common assignee herewith and the teachings of which are incorporated herein by reference. However, other types of motor control modules may be used. Regardless, the control module controls energization of the motor 6. Bend switch 100 and unload switch 102 interface directly with control module 58 as will be explained.

Auto mode control 88 inhibits operation of the zero counter control 66 via line 67 and memory write control 76 via line 75 to prevent accidental changes in the zero or reference set point and the stored finish count for the desired degree bend.

Figure 3:
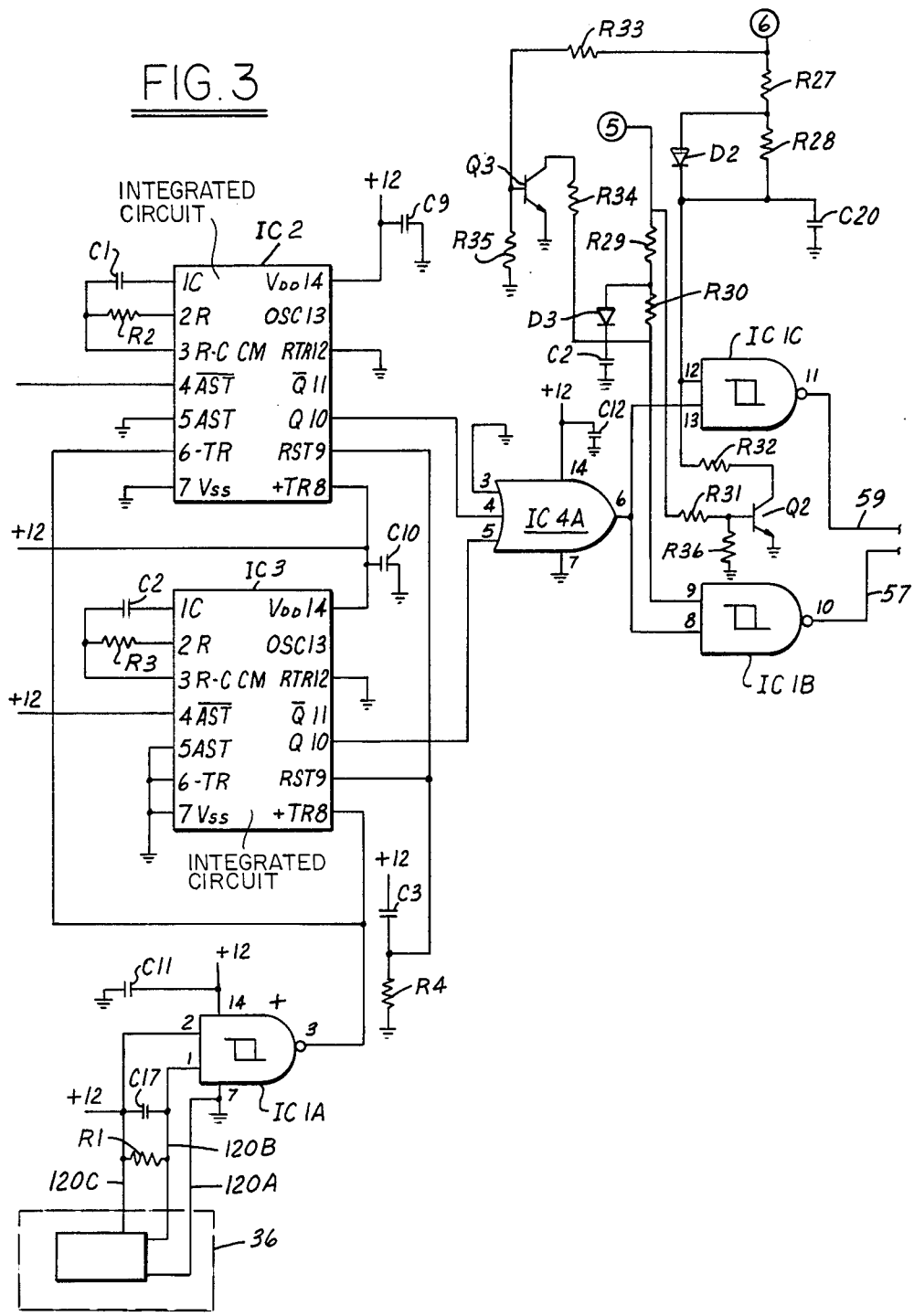
FIG. 3 is a circuit diagram of the sensor, pulse train converter and up-down counter control shown in FIG. 2.

FIG. 3 shows schematically the sensor 36, pulse train converter 50 and up-down counter control 52. In FIGS. 3-6, reference numerals preceded by an "R" indicate a resistor, and by a "C", a capacitor. Sensor leads 120A, B, C are connected to conventional NAND gate IC1A (Schmidt trigger) as shown to enhance the squareness (signal conditioner) of the square wave sensor output signal. Lead 120A is connected to common or ground. Lead 120C is connected to +12 volts. Lead 120B is the signal output of the sensor in the form of an open collector, R1 providing the load for the output and C17 providing transient protection. Capacitor C11 provides transient protection (decoupling) for the Schmidt trigger.

Output from pin 3 of the NAND gate (Schmidt trigger) IC1A is a square wave inverted from that outputted by the sensor 36 and goes to IC2 and IC3 which are mono-stable multivibrators (one-shots) operative to provide alternate short-duration pulses (25 microsecond) from each rising and falling edge, respectively, of the square wave signal from NAND gate IC1A. C1 and R2 and C2 and R3 provide the time duration of the pulses outputted from IC2 and IC3. IC2 and IC3 are RCA part number CD4047BE and IC1A is RCA part number CD 4093BE.

Output from multivibrators IC2 and IC3 is OR'ed by OR gate IC4A which is RCA part number CD4075BE. C9, C10, C12 are decoupling capacitors on the supply (+12) terminal of the respective integrated circuits.

The output from terminal 6 of OR gate IC4A is inputted into Schmidt triggers IC1C and IC1B (same part number as IC1A) for suitable direction into the up and down lines 57,59, respectively, to the counters 60 (IC5,6,7). When the bend switch 100 is pressed, bend command line 54 at junction 5 goes to +12 volts and through R29, D3 (switching diode) to input 9 of IC1B allows pulse output from output 10 onto line 57. When the bend switch is released, command line 54 at junction 5 goes to zero volts and the voltage on terminal 9 is held at 12 volts by capacitor C2 and decays slowly through R30 and R29. This allows any pulses caused by mechanical drifting of the machine to reach the up counter line 57 for counting.

If unload switch 102 connected to junction 6 is pressed before the end of the time decay caused by C2, R30, R29, then transistor Q3, R34 and R33 extinguish the time delay or decay immediately to prevent any pulses from reaching up counter line 57.

Junction 5 connects to the solid state control module circuit of the aforementioned copending application Ser. No. 638,080 between inverter 58 and diode 67 and junction 6 connects between inverter 57' and diode 67' shown in FIG. 2A thereof.

Input of pulses onto down line 59 is controlled in the same manner as described hereinabove for the up line 57.

Figure 4B:
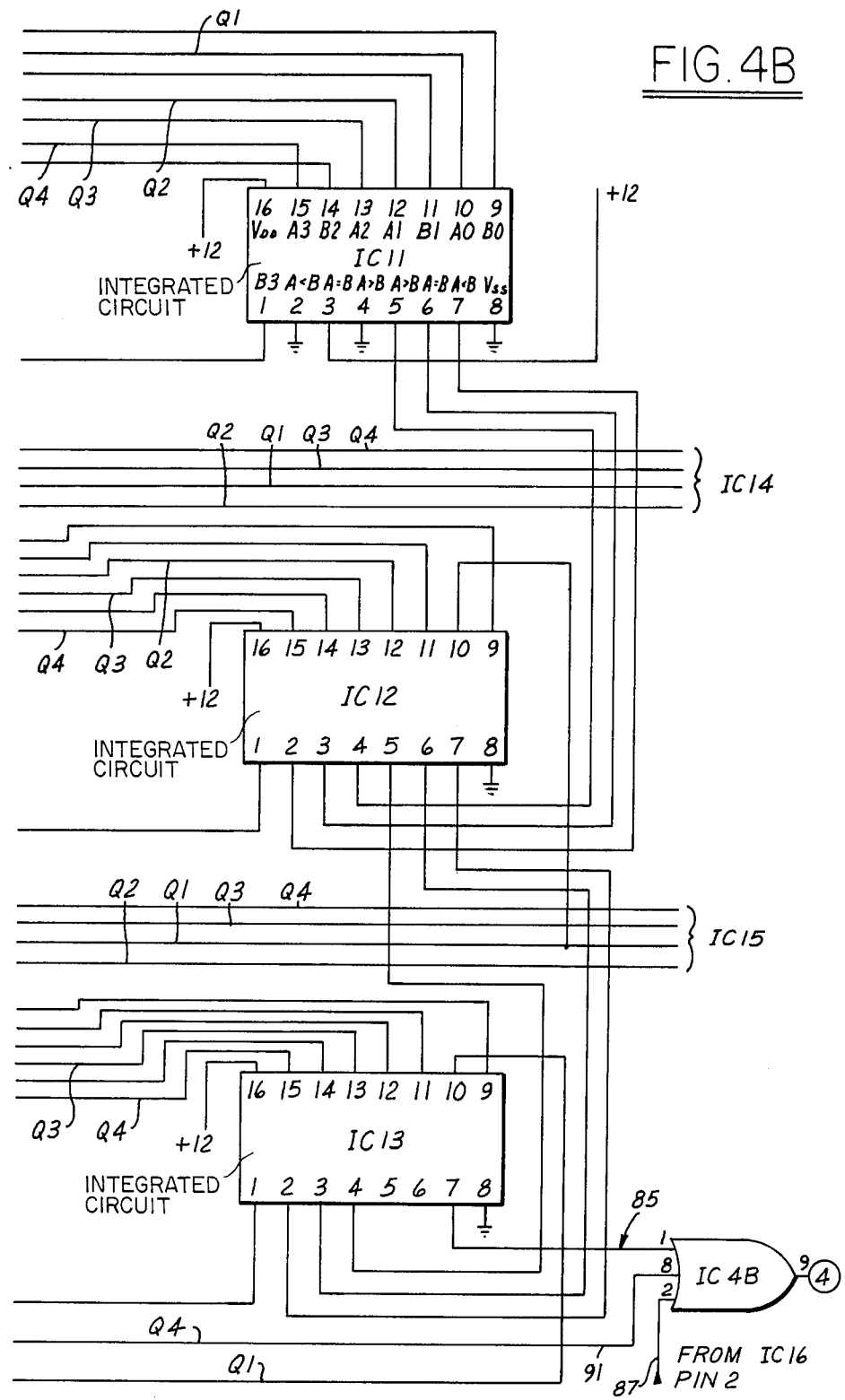
FIGS. 4 A & B is a circuit diagram of the counters, memory and comparators of the control system of FIG. 2.

Up and down lines 57,59 are shown in FIG. 4 interfacing with counters IC5, IC6, and IC7 to provide a three digit bend angle value. IC5, IC6, and IC7 are the ones, tens and hundreds digit, respectively, of the counted bend angle value. IC5-7 are RCA part number CD 40192BE.

Counters IC5, IC6, and IC7 interface as shown with memory storage elements IC8, IC9 and IC10, respectively, which are also the same part number as the counters for storing the ones, tens and hundreds counts or digits, respectively, from the respective counters.

Comparators IC11, IC12 and IC13 interface as shown with IC5 and IC8, IC6 and IC9, and IC7 and IC10, respectively, for comparing the counts in the respective counter with the count stored in its associated memory element. Comparators IC11-13 are RCA part number CD 4063BE.

The down and up inputs of counters IC6 and IC7 are connected to the borrow and carry outputs 13, 12 of counters IC5 and IC6, respectively, as shown.

$Q_1$-$Q_4$ is a four bit representation of a decimal number which is provided for the ones, tens and hundreds digits of the bending angle value.

Reset pins 14 of counters IC5, IC6 and IC7 are connected together and reset pins 14 of memory elements IC8, IC9 and IC10 are connected together and interface with respective reset circuit lines 64 and 70B as shown in FIG. 5.

Enabling pins 11 of memory elements IC8, IC9 and IC10 are connected together and to Schmidt trigger IC1D (same part number as IC1A) via line 78 as shown in FIG. 5.

Figure 6:
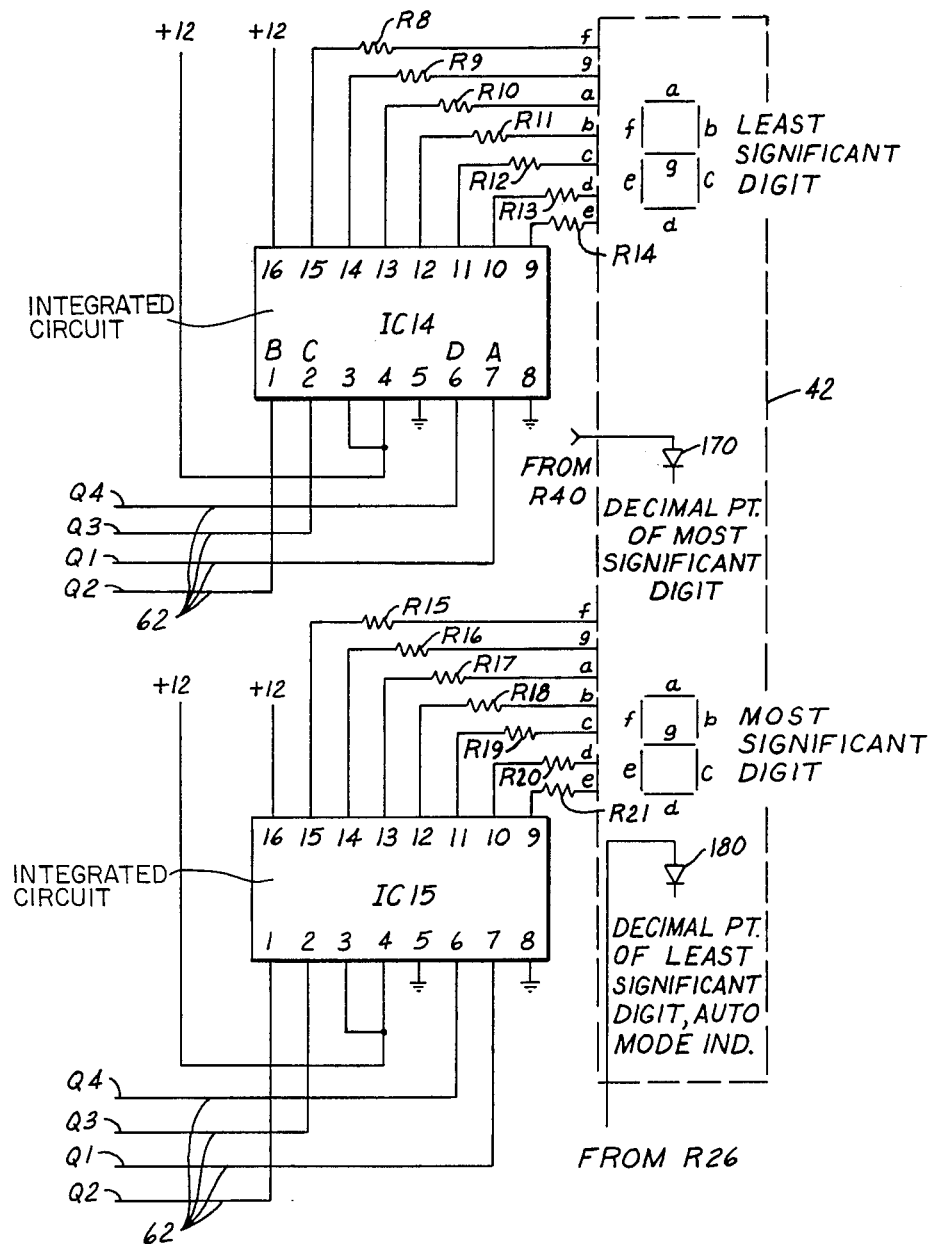
FIG. 6 is a circuit diagram of the display driver and numerical display on the remote control unit.

Output bits $Q_1$-$Q_4$ of each of counters IC5 and IC6 represent a decimal number and are sent via $Q_1$-$Q_4$ bit lines to the inputs A-D of display drivers IC14 and 15, respectively, as shown in FIG. 6 to drive display 42.

The output of comparator IC13 from terminal 7 is sent to terminal 1 of OR gate IC4B, RCA part number CD 4075BE, and is the motor bend control 86 shown in FIG. 2. Junction 4 interfaces with the motor control circuit of the aforementioned copending application Ser. No. 638,080 at line 25 of AND gate 21 with the +12 volts removed therefrom.

Line 87 connects to auto mode control 88 of FIG. 2 as shown in detail in FIG. 5. Line 91 connects to bit line $Q_4$ of IC7 to provide a most significant bit of the most significant digit to OR gate IC4B to prevent stoppage of motor 6 upon counter rollover through 0° as explained above with respect to FIG. 2.

FIG. 5 illustrates the switching circuitry on remote control unit 32, the auto mode control circuitry 88, counter zero control 66, memory write control 76 and power reset 68.

As shown, zero set switch 66 goes through capacitor C5 and resistor R6 which function as a transient filter and through R17 to IC17 and diode D1 to reset the counters IC5, IC6 and IC7 to zero count via line 64. Bend set switch 76 goes through C15, R7 for transient filtration and through Schmidt trigger IC1D and line 78 to write or transfer the counts from counters IC5-7 to the respective memory element IC8-10.

Auto switch 92 connects through C19, R24 for transient filtration to IC16 which is a bi-stable multivibrator, RCA part number CD 4013BE. IC16 is set to function to allow OR gate IC4B to function via line 87 and prevent the zero set and bend set switch circuitry from functioning when the auto switch has been pressed and also energizes the auto mode indicator light 180 (see FIG. 6) on display 42 of remote control unit 32 via R25, R26 and transistor $Q_1$, which together function as the driver amplifier for the auto mode indicator light.

The bend and unload switches 100,102 and their respective timing circuits of transistor $Q_1$, transistor $Q_5$, $C_{22}$, $C_{23}$, $R_{38}$ and $R_{39}$, which function to prevent simultaneous actuation of the bend and unload functions, interface at junctions 3 and 2 with the solid state control module 58 at its contacts 18,18', respectively, of FIG. 2A of the aforementioned copending application Ser. No. 638,080.

Set-up switch 94 connects through R23, C18, for transient protection to bi-stable multivibrator IC16 to reset same to prevent OR gate IC4B from functioning and to allow the bend set and zero set to function. C18 and R23 also function as a power up reset 160 to clear IC16 into the set-up mode when the machine is turned on (plugged in) by the operator. Power on reset 68 also functions when the operator plugs in the power cord of the machine.

When bend-set switch 76 is pressed, R40 energizes the bend-set indicator light 170 on the remote control unit 32 to inform the operator of contact closure.

FIG. 6 shows the display drivers IC14 and IC15 (driver decoders) for driving the seven segments a-g of each LED digit display 42 in known manner through typical one thousand ohm resistors R8-R21. The decimal points of the two digit display 42 function as the bend set indicator LED light 170 and the auto mode LED indicator light 180 as indicated above.

In FIGS. 3 and 5, R35, R36 and R37 function as base bypass resistors for transistors $Q_3$, $Q_2$ and $Q_1$ respectively. Capacitors C6, C7 and C8 in FIG. 4 are decoupling capacitors to ground. Capacitor C3 and resistor R4 function to reset IC2 and IC3 at initial power up of the machine.

Values for the capacitors and resistors discussed hereinabove with respect to FIGS. 3-6 are as follows:

C1-C2=0.001 uF
C3, C5-12, C15, C17, C19=0.1 uF
C20-C21=0.22 uF
C16, C18=1.0 uF
C22, C23=10 uF
R1=2.7K ohm
R6, R7, R8-24, R26, R32, R34, R4=1K
R2-R4, R27, R29=10K
R35-R37=47K
R5, R25, R31, R33, R38, R39=100K
R28, R29=10 MEG While certain specific and preferred embodiments of the invention have been described in detail hereinabove, those skilled in the art will recognize that various modifications and changes can be made therein within the scope of the appended claims which are intended to include equivalents of such embodiments. For example, an absolute encoder may be used in lieu of the sensor and counting means to provide aggregate position signals representative of degree of rotation of the bending shoe and would interface with the storage means and comparator means described. The encoder would provide the sensing function and provide an aggregate count or signal representative of bending shoe rotation relative to a reference position.

I claim:
1. In a bending machine having a bending shoe means including a rotatable bending shoe, an electric motor actuated for driving the bending shoe in rotation and means for drivingly connecting the bending shoe and electric motor, the combination of:
 (a) sensing means for determining the degree of rotation of the bending shoe by sensing the degree of rotation of the bending shoe means in increments and generating an increment signal for each increment of rotation,
 (b) counting means for receiving and counting the increment signals from the sensing means relative to a start reference count,
 (c) referencing means for providing the start reference count in the counting means before shoe rotation,
 (d) storage means for storing a finish count in the counting means corresponding to the number of increment signal counts relative to the start refer- ence count counted for rotation of the bending shoe to a desired bend angle,
(e) means for transferring said finish count from the counting means to the storage means,
(f) comparator means for comparing said stored finish count to the actual count for the bending shoe during bending,
(g) control means for controlling the motor and responsive to a signal from the comparator means indicative that the actual count equals or exceeds the stored finish count for terminating motor actuation to stop motor driven bending, and
(h) rollover means operative in response to a count in the counting means counted during rotation of the bending shoe in a direction to unload a workpart for permitting rotation of the bending shoe in the unload direction past the start reference count.

2. The bending machine of claim 1 further including timing means for allowing the counting means to continue counting after the control means terminates motor actuation to account for mechanical movement of the bending shoe thereafter.

3. The bending machine of claim 1 wherein the sensing means comprises a sensor in proximity to a rotatable transmission member in the connecting means for sensing rotation of the transmission member in increments.

4. The bending machine of claim 3 wherein the sensor is a proximity sensor and the transmission member includes multiple openings therein that pass by the sensor during rotation of the transmission member.

5. The bending machine of claim 1 wherein the referencing means provides a zero start reference count in the counting means.

6. The bending machine of claim 1 which further includes visual display means for displaying the actual count in the counting means.

7. In a bending machine having a bending shoe means including a rotatable bending shoe, an electric motor actuated for driving the bending shoe in rotation and means for drivingly connecting the bending shoe and electric motor the combination of:
(a) means for providing an aggregate position signal representative of degrees of rotation of the bending shoe relative to a start reference position,
(b) storage means for storing the aggregate position signal from the signal providing means corresponding to the degree of rotation of the bending shoe to a desired bend angle,
(c) means for transferring said aggregate position signal from the signal providing means to the storage means,
(d) comparator means for comparing said stored aggregate position signal to the actual position signal for position of the bending shoe during each bend,
(e) control means for controlling the motor and responsive to a signal from the comparator means indicative that the actual position signal equals or exceeds the stored aggregate position signal for terminating motor actuation to stop motor driven bending, and
(f) rollover means operative in response to a count in the counting means counted during rotation of the bending shoe in a direction to unload a workpart for permitting rotation of the bending shoe in the unload direction past the start reference count.

* * * * *